(12) United States Patent
Van Diepen (10) Patent No.: US 9,751,593 B2
(45) Date of Patent: Sep. 5, 2017

(54) WAVE PIERCING SHIP HULL (71) Applicant: Peter Van Diepen, Vancouver (CA)

(72) Inventor: Peter Van Diepen, Vancouver (CA)

( * ) Notice: Subject to any disclaimer, the term of this patent is extended or adjusted under 35 U.S.C. 154(b) by 0 days.

(21) Appl. No.: 14/611,141

(22) Filed: Jan. 30, 2015

(65) Prior Publication Data

US 2017/0021898 A1 Jan. 26, 2017

(51) Int. Cl.
| B63B 1/06 | (2006.01) |
| B63B 1/40 | (2006.01) |
| B63B 39/00 | (2006.01) |
| B63B 17/00 | (2006.01) |
| B63B 39/06 | (2006.01) |

(52) U.S. Cl.
CPC ............... *B63B 1/06* (2013.01); *B63B 1/063* (2013.01); *B63B 1/40* (2013.01); *B63B 39/00* (2013.01); *B63B 2001/066* (2013.01); *B63B 2017/009* (2013.01); *B63B 2039/067* (2013.01); *Y02T 70/126* (2013.01)

(58) Field of Classification Search
CPC .... B63B 1/00; B63B 1/04; B63B 1/06; B63B 1/10; B63B 1/40
USPC .......................................... 114/61.27, 61.28
See application file for complete search history.

(56) References Cited

U.S. PATENT DOCUMENTS

| 2,139,594 A | 12/1938 | Kort |
| 3,038,432 A | 6/1962 | Goldman |
| 3,499,412 A | 3/1970 | Anthes et al. |
| 3,677,660 A | 7/1972 | Taniguchi et al. |
| 3,835,800 A | 9/1974 | Goren et al. |
| 4,075,860 A | 2/1978 | Hansen |
| 4,147,123 A | 4/1979 | Kirby et al. |
| 4,150,635 A | 4/1979 | Goren et al. |
| 4,288,223 A | 9/1981 | Gomez et al. |
| 4,304,558 A | 12/1981 | Holtermann |
| 4,492,176 A | 1/1985 | Arima |
| 4,509,925 A | 4/1985 | Wuhrer |
| 4,649,851 A | 3/1987 | April |
| 5,246,393 A | 9/1993 | Von Der Stein |
| 5,626,669 A | 5/1997 | Burg |
| 6,116,180 A | 9/2000 | Thompson |
| 6,158,369 A | 12/2000 | Calderon |
| 6,439,148 B1 | 8/2002 | Lang |
| 6,550,408 B1 | 4/2003 | Janssen |
| 7,052,339 B2 | 5/2006 | Abdel-Maksound et al. |
| 7,111,571 B2 | 9/2006 | Kosomaa et al. |
| 7,143,710 B2 | 12/2006 | Lang |
| 7,854,637 B2 | 12/2010 | Schultz |
| 2002/0162498 A1 | 11/2002 | Robinson et al. |
| 2003/0089290 A1* | 5/2003 | Van Diepen ............ B63B 39/00 114/61.27 |
| 2006/0124042 A1 | 6/2006 | Schulz |

(Continued)

FOREIGN PATENT DOCUMENTS

| CA | 993276 | 7/1976 |
| CA | 2259276 | 11/1998 |

(Continued)

*Primary Examiner* — Lars A Olson
(74) *Attorney, Agent, or Firm* — Richard D. Okimaw (57) ABSTRACT

A ship hull comprises a bottom portion having a wave piercing bow, a top portion having first and second side surfaces extending to a top deck and a substantially horizontal surface extending away from the bottom portion at a position between the bottom portion and the top portion.

8 Claims, 8 Drawing Sheets

(56) References Cited

U.S. PATENT DOCUMENTS

| | | |
|---|---|---|
| 2007/0107646 A1 | 5/2007 | Alvarez-Calderon |
| 2007/0137541 A1 | 6/2007 | Linsley |
| 2008/0070455 A1 | 3/2008 | Chen |
| 2010/0307401 A1 | 12/2010 | Bereznitski et al. |
| 2013/0315704 A1 | 11/2013 | Jurgens et al. |
| 2014/0096710 A1 | 4/2014 | Keller |

FOREIGN PATENT DOCUMENTS

| | | |
|---|---|---|
| CA | 2297263 | 1/1999 |
| CA | 2333169 | 12/1999 |
| CA | 2524176 | 3/2005 |
| CA | 2656119 | 2/2008 |
| CA | 2706996 | 2/2011 |
| CN | 102514681 | 6/2012 |
| CN | 202358272 | 8/2012 |
| CN | 103328323 | 9/2013 |
| CN | 103496440 | 1/2014 |
| DE | 3742581 | 7/1989 |
| DE | 202004009207 | 10/2005 |
| DE | 10201153619 | 3/2013 |
| EP | 0862531 | 9/1998 |
| FI | 935645 | 1/1994 |
| FI | 122660 | 5/2012 |
| NL | 8801538 | 1/1990 |
| NO | 20120299 | 9/2013 |
| UA | 78809 | 4/2007 |
| WO | 03082662 | 10/2003 |
| WO | 2013142092 | 9/2013 |
| WO | 2013162474 | 10/2013 |
| WO | 2013178853 | 12/2013 |

\* cited by examiner

WAVE PIERCING SHIP HULL

BACKGROUND OF THE INVENTION

1. Field of Invention

The present invention relates to ship hulls in general and in particular to a ship hull having a single hull with a wave piercing bow.

2. Description of Related Art

A ship moving in waves is subjected to vertical accelerations. A traditional bow, having transverse sections that are the widest at the deck, is typically lifted up by its volume when it passes through a wave crest, which then causes it to fall into the trough between waves. This periodic movement is commonly referred to as "pitching", and in certain conditions it results in high amplitude and acceleration levels. In extreme cases, at certain combinations of ship's speed, hull length and wave height, the hull will emerge from, and then crash back into the water.

To prevent damage to the hull, the rules governing structural design of ships, call for a suitably strong, and therefore heavy, shell and its supporting structure. Structural strength requirement can be reduced under the construction rules only if the global loads (bending moments between the waves, referred to as sagging, or over the wave, referred to as hogging) and local loads (slamming) are reduced. In turn, these loads can only be lowered by reducing the level of hull's response to the waves. The benefits of reduced structural weight are significant. Firstly, the construction cost is reduced, as less material needs to be purchased and installed. Secondly, a lighter craft requires less power to achieve the required speed, further reducing the cost of building and operating such a vessel, as smaller engines need to be purchased and less fuel is consumed in service. Finally, reduced acceleration levels result in reducing damage to cargo and the incidence and severity of seasickness in crew and passengers. This directly and significantly increases the revenue-generating potential of ships.

Additionally, certain types of ships, such as passenger ferries or crew boats serving offshore installations, are often restricted in their operation by weather conditions due to the adverse effect of severe motions on crew and passengers. In heavy weather, speed may have to be reduced and course may have to be altered, increasing cost of operating a vessel. Also, in certain weather conditions, pitching motion may cause propellers to emerge and the hull to lose speed. Accelerating back to operating speed requires extra time and energy, and results in overall increase in fuel consumption and operating costs. Finally, in some cases, ships are not permitted to operate at all above certain sea states, present or forecasted.

The described problem has been addressed in the past by introduction of several different types of marine craft, specifically designed to reduce response to wave action and to minimize pitch amplitude and accelerations. One design solution has been to utilize multihull ships fitted with wave piercing bows and a third center bow above static waterline to prevent diving as a passive ride control. However, multihull ships have a relatively low payload to overall weight ratio, because of their heavy decks connecting relatively narrow hulls. Disadvantageously, multihull ships only work up to a certain wave height above which waves begin to hit the deck spanning the hulls, with often even worse effect than a conventional monohull. Such multihull ships are also commonly expensive to construct. There are also several methods of mitigating motions of monohulls in waves with active ride control devices, such as computer controlled articulated foils, however, these are invariably expensive and prone to damage.

SUMMARY OF THE INVENTION

According to a first embodiment of the present invention there is disclosed a boat comprising a non-planing hull having a wave piercing bow and at least one substantially horizontal, generally downwardly oriented surface extending from each side of the planning hull to a distal edge at a location above the line of the bow wave generated at speed at the intended draft at a position proximate to the wave piercing bow.

The boat may further include a top portion extending substantially upwards from the distal edge of the horizontal surfaces and a bottom portion below the horizontal surface.

The horizontal surface has constant height above the line of the bow wave generated at speed. The horizontal surface has a free distal edge.

The bottom portion of the hull includes a leading edge having at least a thereof being rearward inclined. The top portion includes a leading edge having at least a portion thereof being rearward inclined. The top portion includes at least one inwardly sloped surface proximate to a bow of the hull. The horizontal surface forms a bottom of at least one fin extending substantially horizontally from the bottom portion of the hull.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In drawings which illustrate embodiments of the invention wherein similar characters of reference denote corresponding parts in each view.

DETAILED DESCRIPTION

Figure 1:
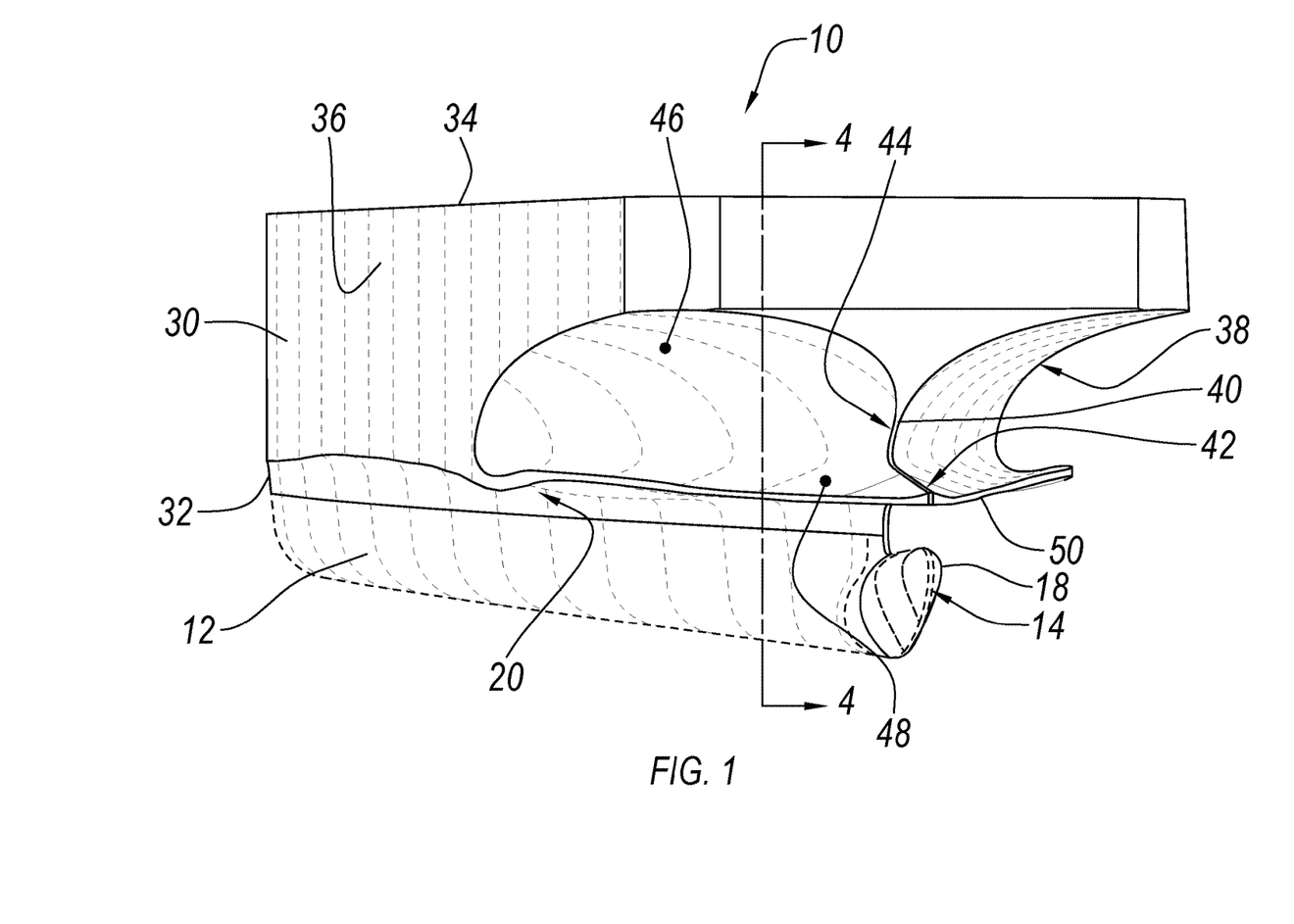
FIG. 1 is a perspective view of a ship hull according to a first embodiment of the present invention.
Figure 5:
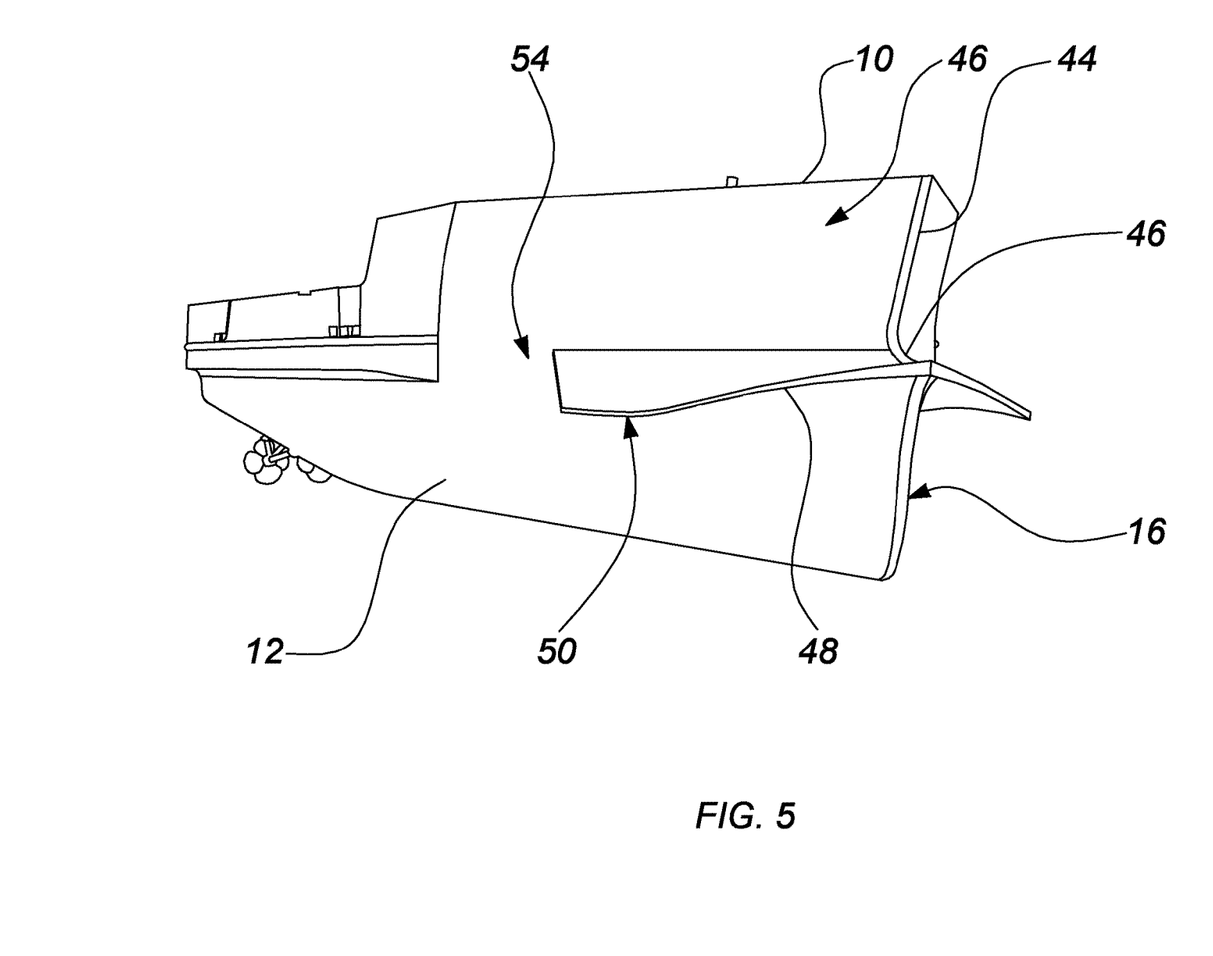
FIG. 5 is a perspective view of a ship hull according to a further embodiment of the present invention.

Referring to FIG. 1, a ship hull according to a first embodiment of the invention is shown generally at 10. The hull comprises a bottom portion 12, a top portion 30 and a substantially horizontal surface 50 therebetween. As utilized herein a non-planing hull will be understood to mean hulls which are classified as displacement hulls in which the weight of the ship is supported by the buoyancy thereof such that the height of the vessel within the water will not significantly change with speed as well as semi-displacement or semi-planing hulls. The bottom portion 12 may be of any conventionally known type such as are commonly known including having a bulbous bow 14 as illustrated in FIG. 1 or a wave piercing bow 16 as illustrated in FIG. 5. As illustrated in FIG. 1 such a bulbous bow 14 may include a rearward inclined leading edge 18 as are known. The bottom portion 12 extends to a top edge 20 which is then connected to or otherwise engaged with the horizontal surface 50.

The top portion 30 extends from a bottom edge 32 proximate to the top edge 20 of the bottom portion to a top edge 34 defining the top of the hull 10. The top portion 30 may include side portions 36 extending along the length or a portion thereof of the ship and a bow portion 38. The bow portion 38 has a leading edge 40 which may include a bottom rearwardly inclined top portion 42 and a top forwardly inclined bottom portion 44. As illustrated the bow portion 38 may include upper surfaces 46 extending away from the top portion 42 of the leading edge 40 and lower surfaces 48 extending away from the bottom portion 44 of the leading edge 40.

Figure 3:
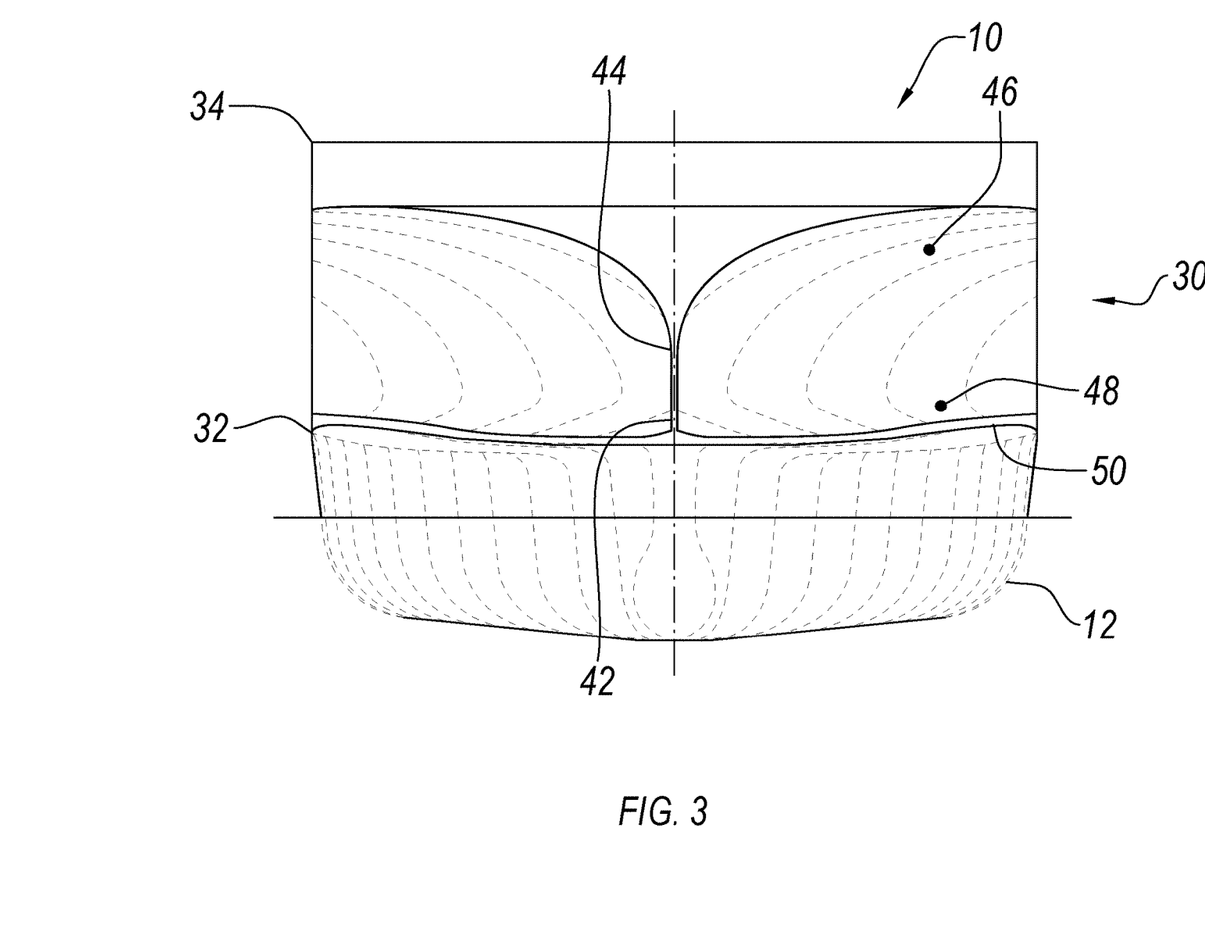
FIG. 3 is a front view of the ship hull of FIG. 1.
Figure 4:
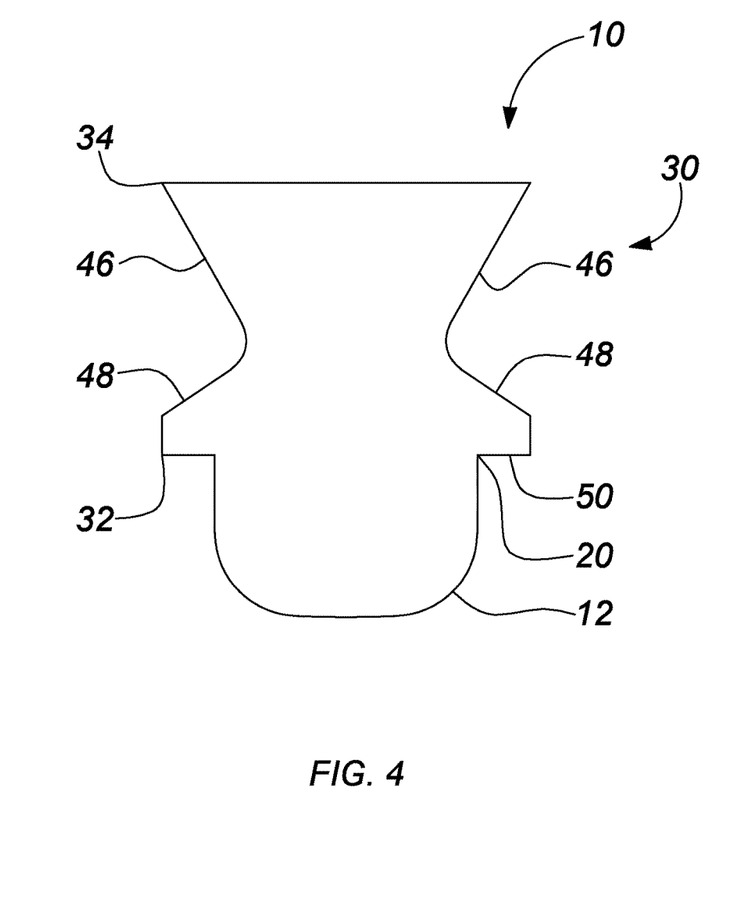
FIG. 4 is a cross sectional view of the ship hull of FIG. 1 as taken along the line 4-4.

As illustrated in FIGS. 3 and 4, the upper surfaces are inclined so as to be wider apart at the top edge 34 of the ship whereas the lower surfaces 48 are inclined so as to be wider at the lower edge of the top portion 30. In such a manner, the lower surfaces 48 are positioned to be partially or fully submerged by a wave encountering the ship such that the lower surfaces 48 provide a lifting surface in a downward direction so as to urge the bow of the ship down thereby counteracting the lifting forces generated by the submerged bow. The shape of the upper and lower surfaces 46 and 48 in the bow portion 38 may be optimized for the speed and intended use of the ship as described in further detail in US Patent Application Publication No. 2003/0089290, the entirety of which is hereby incorporated by reference. In particular, the lower surfaces 48 will have their size, shape and angle optimized for the size of the craft and the design speed, to counterbalance the displacement force and to minimize the pitching motion while moving through the waves. The height lower surfaces 48 above the waterline of the ship will also be optimized in terms of its ratio to the draft of the ship hull to counterbalance the forces causing pitch motions, and reduce the motions and the associated loads of such motions.

Figure 2:
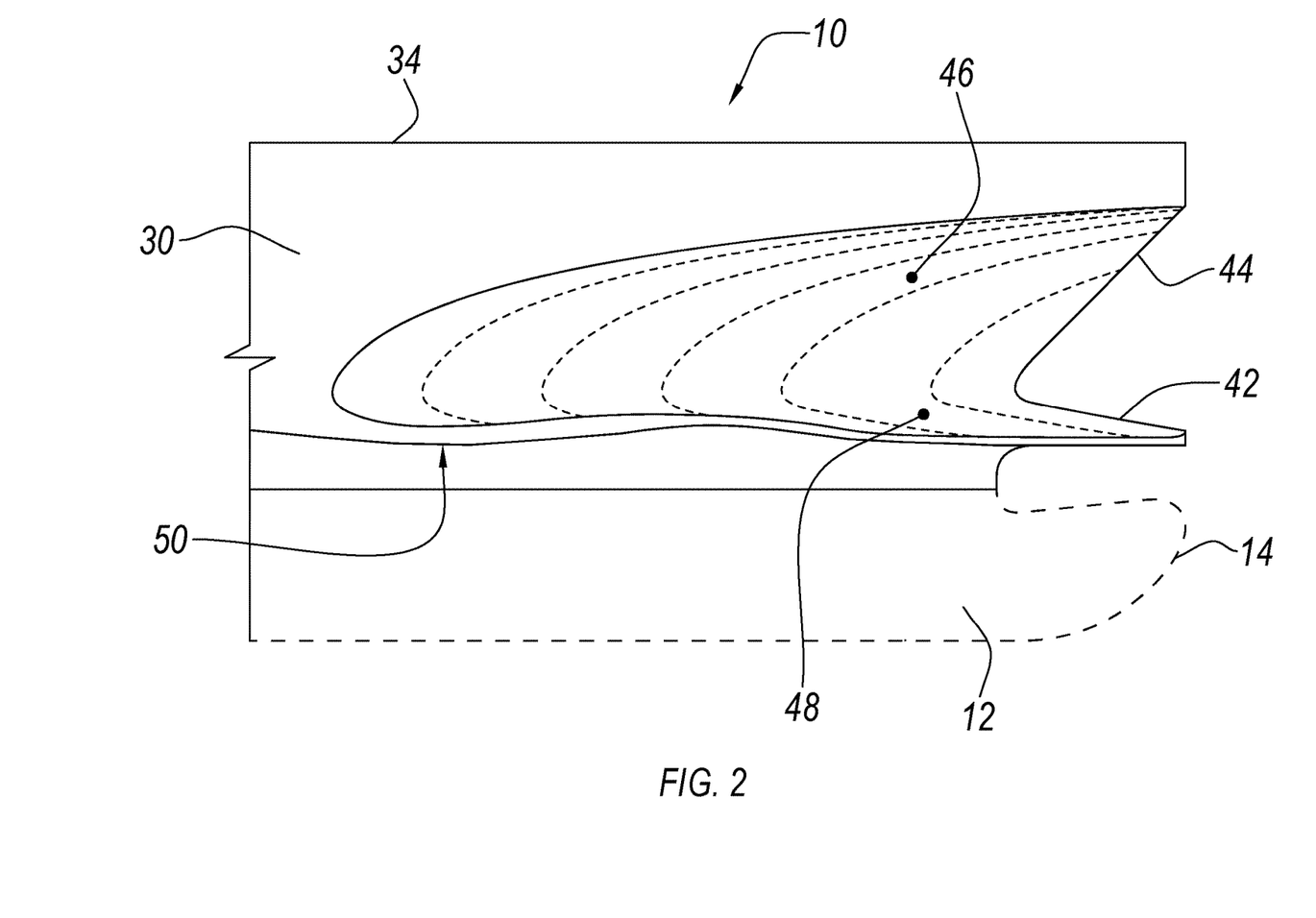
FIG. 2 is a side view of the ship hull of FIG. 1.

Between the bottom portion 12 and the top portion 30 is provided a horizontal surface 50 oriented downwardly towards the water. As illustrated in FIGS. 1 through 4, the horizontal surface 50 may extend from the top edge 20 of the bottom portion 12 to the bottom edge 32 of the top portion. In particular, as illustrated in FIGS. 1 through 4, the bottom edge 32 of the top portion 30 may be located further from a midline of the ship than the top edge 20 of the bottom portion 12 such that the horizontal surface 50 bridges between the two. As illustrated in FIGS. 1 and 2, the horizontal surface 50 may also provide a connection between differences in positions of the bows of the bottom portion and the top portion as well.

Figure 7A:
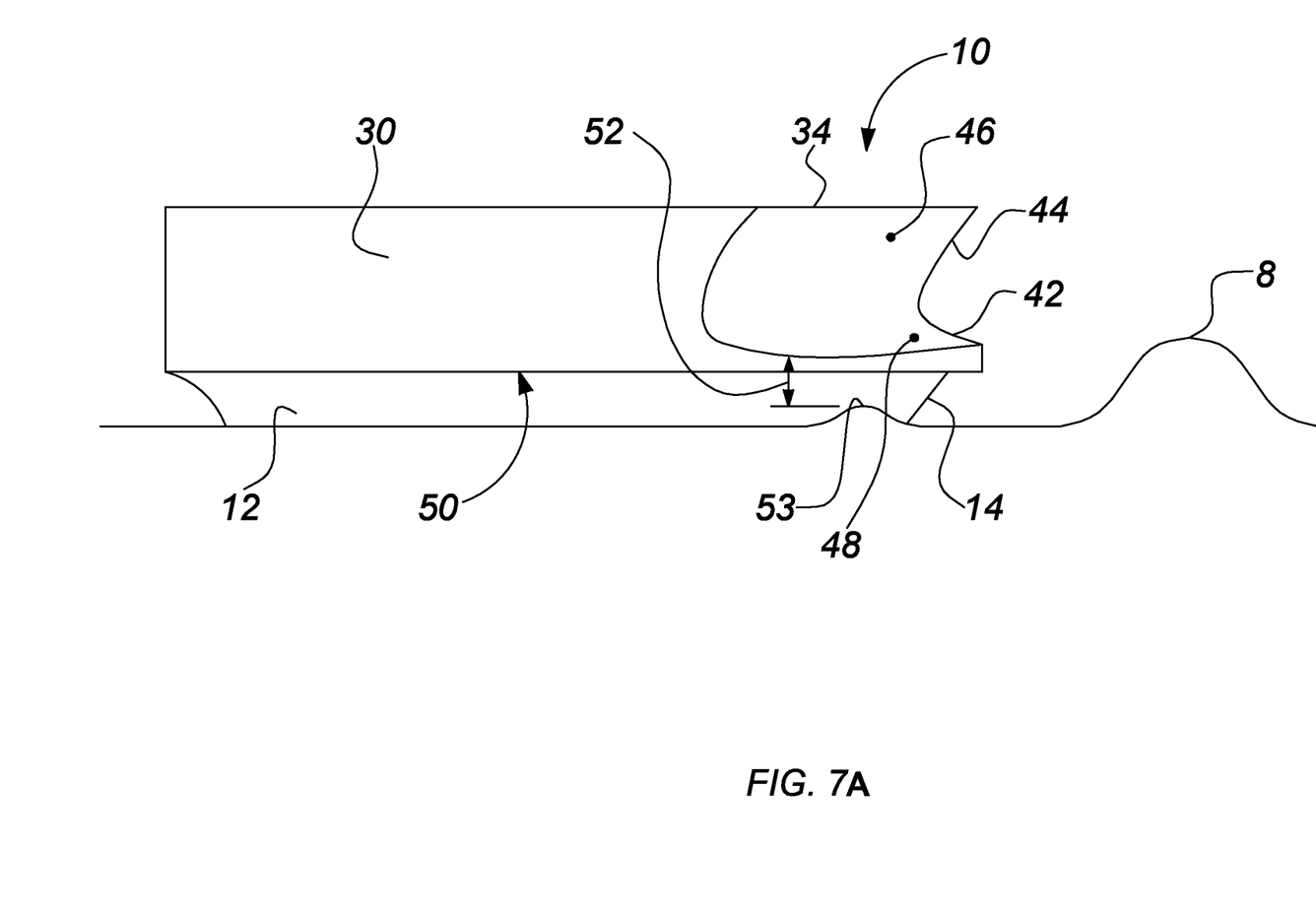
FIG. 7*a* is a side view of the ship hull of FIG. 1 approaching a wave.

As illustrated in FIG. 7*a*, it will be appreciated that at non-planing hull will typically form a bow wave 53 therefrom when moving through the water at speed. The horizontal surface 50 is substantially flat and planar having a constant height 52 above the line of the bow wave generated at speed at the intended draft as illustrated in FIG. 7*a*. The height 52 is selected to space the horizontal surface above the waterline in relatively calm seas and to submerse the horizontal surface below the height of waves above a predetermined height. This height may be selected depending upon the length of the vessel, the size of the waves intended to be encountered and the degree of pitching intended to be counteracted as will be more fully described below such as 6 inches (152 mm).

Figure 7B:
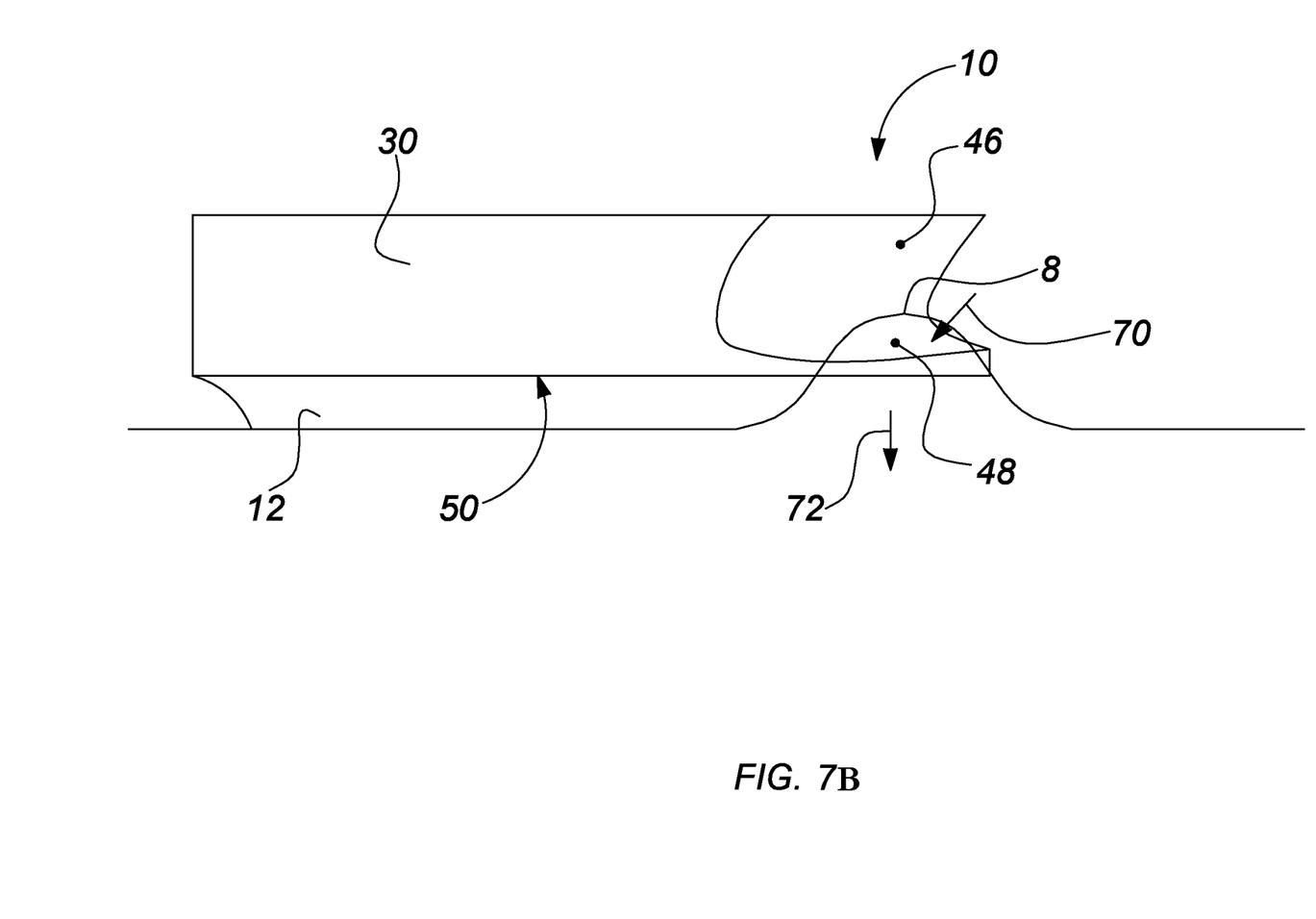
FIG. 7*b* is a side view of the ship hull of FIG. 1 entering a wave.

With reference to FIGS. 7*a* and 7*b*, in operation, as a ship hull 10 approaches a wave 8, the leading edge 40 and 14 of the top and bottom portions 30 and 12 will enter and pierce the wave. Thereafter as illustrated in FIG. 7*b*, the water within the wave will act upon the lower surface 48 so as to provide a generally downward force, indicated at 70 to the bow of the ship thereby resisting any rise in the bow due to the buoyancy of the bow. Furthermore as the wave 8 travels past the ship, the localized speed of the horizontal surface 50 past the water will result in a downward force, generally indicated at 72 due to Bernoulli's principle upon the bottom of the horizontal surface. This downward force 72 will also counteract the forces upon the bow due to the buoyancy of the bow as it travels through the wave thereby reducing pitching of the ship.

Figure 6:
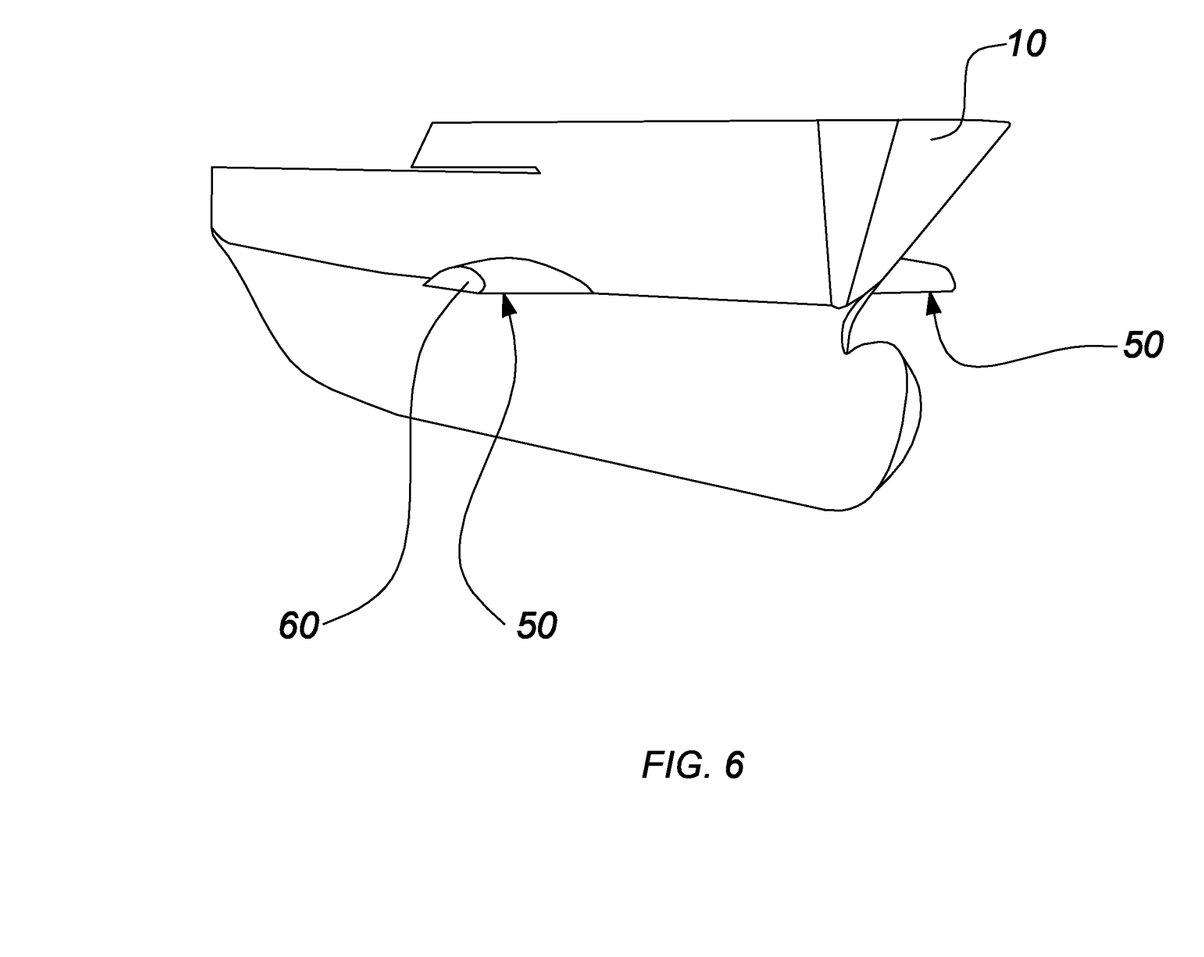
FIG. 6 is a perspective view of a ship hull according to a further embodiment of the present invention.

It will be appreciated that the horizontal surface 50 and the lower surfaces 48 form a structure having a shape similar to a wing or foil therebetween intended to act upon the waves passing therepast. Optionally as illustrated in FIG. 5, the horizontal surface 50 and the lower surfaces 48 may be terminated so as to provide a notch 54 therebehind. Such notches 54 may be particularly useful for ship hulls intended to operate at greater speeds. The size of the notch 54 may be selected depending upon the operating parameters of the ship as set out above. Furthermore, as illustrated in FIG. 6, the horizontal surface 50 may be located on the underside of one or more wings 60 or fins extending from a ship hull 10 for use in retrofitting existing hulls.

While specific embodiments of the invention have been described and illustrated, such embodiments should be considered illustrative of the invention only and not as limiting the invention as construed in accordance with the accompanying claims.

What is claimed is:

1. A boat comprising:
    a non-planing hull having a bow; and
    at least one substantially horizontal protrusion extending from each side of said non-planing hull to a distal edge at a location above a design waterline at a position proximate to said bow,
    said horizontal protrusion having top and bottom surfaces wherein said bottom surface extends substantially from said non-planing hull; and
    wherein said horizontal protrusion is shaped to produce downforce while moving through waves.

2. The boat of claim 1 further including a top portion extending substantially upwards from said distal edge of said horizontal protrusions and a bottom portion below said horizontal surface.

3. The boat of claim 1 wherein said horizontal protrusion has constant height above the line of the bow wave generated at speed.

4. The boat of claim 1 wherein said horizontal protrusion has a free distal edge.

5. The boat of claim 1 wherein said bottom portion of said hull includes a leading edge having at least a portion thereof being rearward inclined.

6. The boat of claim 1 wherein said top portion includes a leading edge having at least a portion thereof being rearward inclined.

7. The boat of claim 6 wherein said top portion includes at least one inwardly sloped surface proximate to a bow of said hull.

8. The boat of claim 1 wherein said horizontal protrusion forms a bottom of at least one fin extending substantially horizontally from said bottom portion of said hull.

* * * * *